United States Patent
Mani et al.

(10) Patent No.: US 9,215,204 B2
(45) Date of Patent: Dec. 15, 2015

(54) FEDERATION ROUTE CACHE BASED ON DYNAMIC DOMAIN NAME SYSTEM SERVER

(75) Inventors: Mahalingam Mani, Cupertino, CA (US); David Ahrens, San Jose, CA (US); Manish Gaur, Dublin, CA (US)

(73) Assignee: Avaya Inc., Basking Ridge, NJ (US)

( * ) Notice: Subject to any disclaimer, the term of this patent is extended or adjusted under 35 U.S.C. 154(b) by 490 days.

(21) Appl. No.: 13/285,383

(22) Filed: Oct. 31, 2011

(65) Prior Publication Data

US 2013/0111064 A1    May 2, 2013

(51) Int. Cl.
   *G06F 15/16*   (2006.01)
   *H04L 29/12*   (2006.01)
(52) U.S. Cl.
   CPC ........ *H04L 61/1511* (2013.01); *H04L 61/6009* (2013.01)
(58) Field of Classification Search
   CPC .............. H04L 61/1511; H04L 61/302; H04L 61/6009
   USPC .......................................................... 709/245
   See application file for complete search history.

(56) References Cited

U.S. PATENT DOCUMENTS

| | | | |
|---|---|---|---|
| 2002/0040390 A1* | 4/2002 | Sullivan et al. | 709/219 |
| 2003/0007482 A1* | 1/2003 | Khello et al. | 370/352 |
| 2004/0100976 A1* | 5/2004 | Chang et al. | 370/401 |
| 2004/0249971 A1* | 12/2004 | Klinker | 709/239 |
| 2007/0294427 A1* | 12/2007 | Retkin et al. | 709/245 |
| 2008/0307092 A1* | 12/2008 | Kwon et al. | 709/225 |
| 2011/0075824 A1* | 3/2011 | Geppert et al. | 379/93.12 |

* cited by examiner

Primary Examiner — Esther B Henderson
(74) Attorney, Agent, or Firm — Sheridan Ross P.C.

(57) ABSTRACT

Methods and systems for providing a cache of federated routing information on a dynamic domain name server are provided. More particularly, information obtained from a federation broker can be stored in a dynamic domain name server associated with an enterprise for use in connection with requests for communication links originating from communication endpoints included in the enterprise. By providing this cache of information, requests for federated routing information made to the federation broker can be reduced.

10 Claims, 3 Drawing Sheets

FEDERATION ROUTE CACHE BASED ON DYNAMIC DOMAIN NAME SYSTEM SERVER

FIELD

The invention relates to the caching of communication link information. More particularly, information used to complete communication links between federated domains is facilitated.

BACKGROUND

Packet data networks, including Internet protocol (IP) communication networks typically utilize domain name system or service (DNS) lookups in order to route calls within an enterprise or domain. Where a destination or endpoint is associated with a different enterprise or domain from that of the originating endpoint, the completion of the communication link requires that the destination domain be resolved. In a typical federated system, this requires a secure DNS lookup at a federation broker, typically located within the cloud. Provided the security requirements of the federation broker are met, the required routing information is returned to the originating enterprise or domain, and in particular to the communications server (e.g., a call server) handling the requested communication. The communication server can then apply the received information to complete the communication link to the endpoint in the other enterprise or domain.

Each time a communication link to an endpoint in a destination domain that is different than the originating domain is to be established, a request must be sent to the federation broker. However, this can be an expensive operation in terms of time and resources. Although dynamic DNS servers that maintain addressing information are known, such systems are limited to addressing local endpoints (i.e., entities within the same domain as the originating endpoint). In addition, existing systems are not capable of preventing or limiting requests for information to a federation broker that the federation broker has previously indicated is unavailable.

SUMMARY

According to embodiments of the present disclosure, systems and methods for providing addressing and/or routing information in connection with communication sessions or links between different enterprises or domains are provided. More particularly, the disclosed invention provides a dynamic augmentation of a federated route resolution, without requiring changes to the federated enterprise route resolution model, and while using standards based interfaces. The disclosed invention provides for the posting of successful federation lookups into the local dynamic domain name system (DNS) server. In accordance with further embodiments, unsuccessful federation lookups can also be posted to the local dynamic DNS server. Accordingly, the dynamic DNS server operates as a cache of connection information for a federated system.

More particularly, in response to a request to establish a communication session handled by a communication server associated with a first domain or enterprise, a DNS lookup is performed with respect to a DNS server within the first enterprise. If the lookup fails, a privileged secure DNS lookup is made using the federation broker in the cloud. A successful lookup in the federation broker returns the required connection information, which is cached in the local DNS server. As a result, subsequent lookups to the same destination can be serviced by the local DNS server after the caching operation has been completed.

In accordance with further embodiments, the local DNS server can also maintain a negative cache. In particular, where a request for connection information made to a federation broker fails, a record of the failure can be maintained in the local DNS server. Subsequent requests for connection information associated with the failed request can then be handled without requiring that a contact with the federation broker be initiated. When a failing domain rejoins the federation, the negative cache information in the DNS server can be updated.

DETAILED DESCRIPTION

Figure 1:
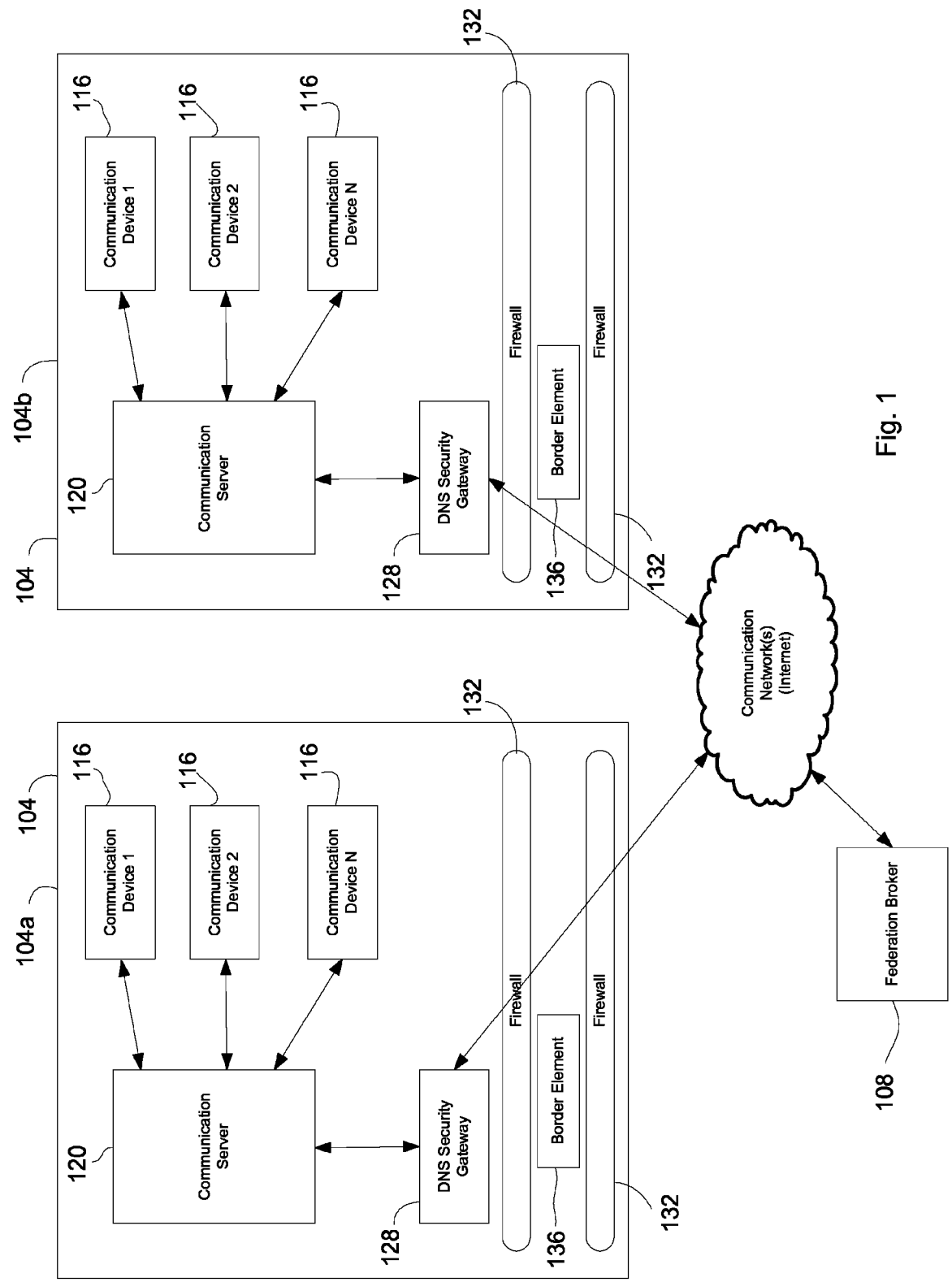
FIG. 1 depicts an exemplary system in accordance with embodiments of the invention.

FIG. 1 illustrates an exemplary federated communication system 100. The federated system 100 generally includes two or more federated domains or enterprises 104 related to one another as part of a brokered federation. Accordingly, although first 104*a* and second 104*b* enterprises are shown in the figure, a system 100 can include more than two federated enterprises 104. In addition, the system 100 includes a federation broker 108. The enterprises 104 are interconnected to one another and to the federation broker 108 by one or more communication networks 112.

Each domain 104 can include a number of devices or nodes. For example, each enterprise 104 can include a plurality of communication devices or endpoints 116, one or more communication servers 120, and a dynamic domain name system (DNS) server 124. An enterprise 104 can additionally include a domain name system security gateway 128, one or more firewalls 132, and one or more session border elements 136.

The communication network or networks 112 may comprise any type and any number of communication mediums and devices that are capable of supporting communication sessions between enterprises 104 and/or the federation broker 108 within the system 100, including communication sessions or links, or other connections, between communication endpoints 116 associated with different enterprises 104. Examples of communication sessions that may be supported by the communication network or networks 112 include voice calls, video calls, chats, emails, teletype (TTY) calls, multimedia sessions, or the like.

More particularly, the communication network or networks 112 can include one or more local area networks (LANs) one or more wide area networks (WANs), one or more session initiation protocol (SIP) networks, and any other type of packet switched or circuit switched network known in the art. In addition, the communication network or networks 112 need not be limited to any one network type, and instead may be comprised of a number of different networks and/or network types. The communication network or networks 112 may further include an IP multimedia subsystem (IMS), an architectural substandard well known in the art, or any other type of network that provides access to one or more of the Internet, standard plain old telephone system (POTS), an integrated services digital network (ISDN), the public switched telephone network (PSTN), and any type of cellular communication or other wireless network.

As can be appreciated by one of skill in the art after consideration of the present disclosure, a federated system 100 can support a plurality of communication sessions or links, also referred to herein as connections, in various communication link formats between communication endpoints 116 within an enterprise 104, and between federated enterprises 104, that are established over a communication network or networks 112. Moreover, in order to complete communication links between endpoints in different enterprises 104, certain connection information is required. As examples, and without limitation, such connection information can include an endpoint telephone number, point of presence for the entry point, or other information.

Figure 2:
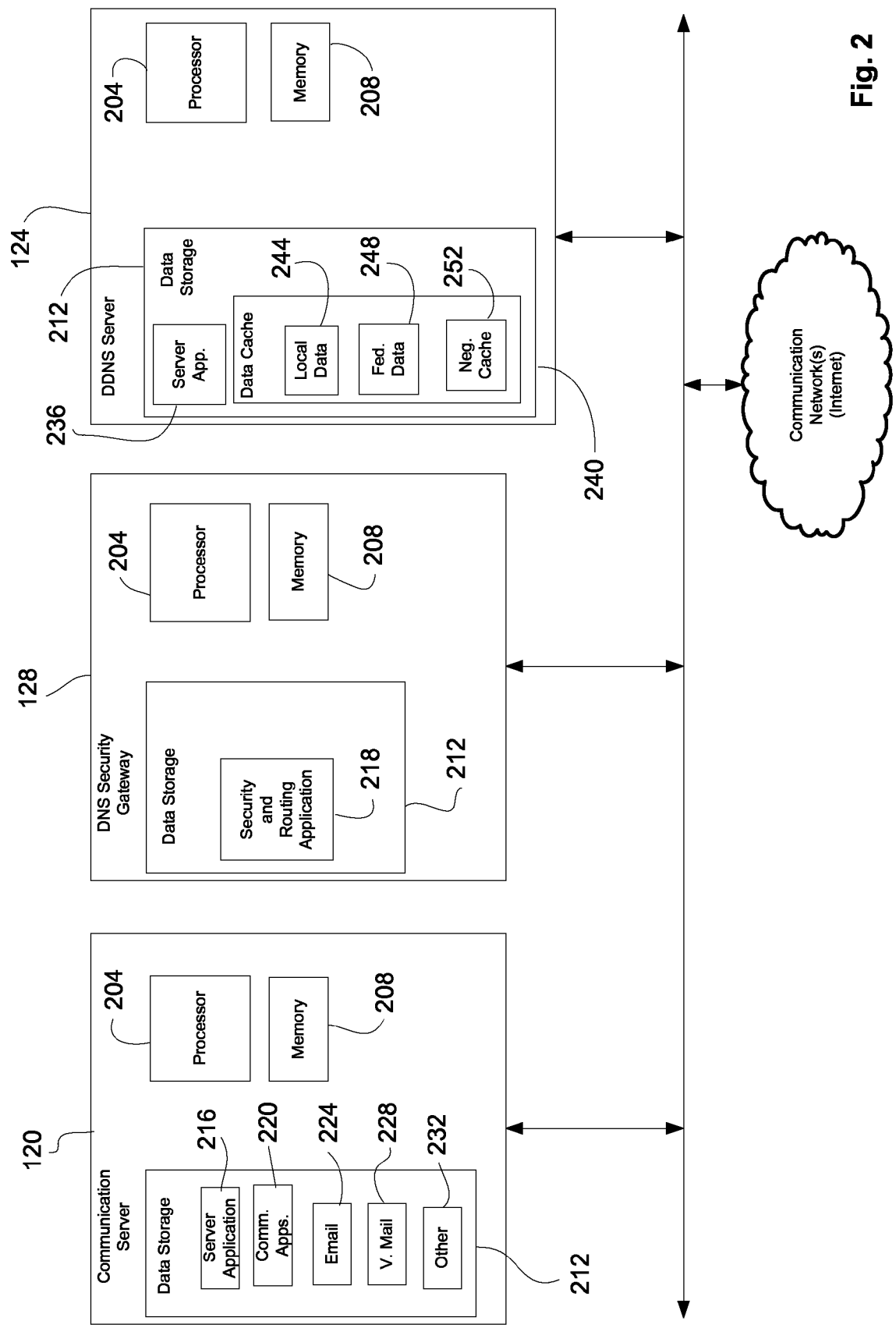
FIG. 2 illustrates components of exemplary communication system components in accordance with embodiments of the present disclosure.

FIG. 2 illustrates components of an enterprise 104 in accordance with embodiments of the present disclosure in greater detail. More particularly, details of a communication server 120, DNS security gateway 128, and dynamic DNS server 124, in accordance with embodiments of the disclosed invention, are illustrated. In general, the communication server 120, the dynamic DNS server 124, and the DNS security gateway 128 each include a processor 204. The processor 204 can comprise a general purpose programmable processor or controller for executing application programming or instructions. As a further example, the processor 204 may comprise a specially configured application specific integrated circuit (ASIC) or other integrated circuit, digital signal processor, hardwired electronic or logic circuit such as a discrete element circuit, programmable logic device or gate array, such as a PLD, PLA, FPGA, PAL, special purpose computer, or the like. The processor 204 generally functions to run programming code or instructions implementing various functions of the communication server 120 or dynamic DNS server 124.

A communication server 120, a dynamic DNS server 124, and a DNS security gateway 128 may additionally include memory 208 for use in connection with the execution of application programming by the processor 204, and for the temporary or long term storage of program instructions and/or data. As examples, the memory 208 may comprise RAM, SDRAM, or other solid state memory. Alternatively or in addition, data storage 212 may be provided. In accordance with embodiments of the disclosed invention, data storage 212 can contain programming code or instructions implementing various of the applications or functions executed or performed by the component 120, 124, or 128. In addition, as described herein, memory 208 or data storage 212 associated with the dynamic DNS server 124 can include various cached communication link or connection information that originated from a federation broker 108. The memory 208 and/or data storage 212 of the DNS server 128 can additionally include communication link or connection information stored by a conventional DNS server that can be used to complete communication links between endpoints within the enterprise 104.

In accordance with embodiments of the present disclosure, the memory 208 and/or data storage 212 can include various applications. For example, a communication server 124 can include application programming in the form of a server application 216. The server application 216 can generally control operation of the communication server 120. For example, where the communication server 120 comprises a call server, a server application 216 comprising a communication manager can be included. The communication manager can comprise an Internet protocol private branch exchange (IP PBX), such as the Avaya Aura Session Manager. The server application 216 can therefore operate in connection with the initiation and control of communication sessions, and the provision of features for such sessions. Moreover, the server application 216 can perform functions related to the request and handling of routing information in association with the federation broker 108 and/or the dynamic DNS server 124. As a further example, the DNS security gateway 128 can include a security and routing application 218. Accordingly, functions related to interactions with the federation broker 108 and/or the dynamic DNS server 124 can be performed through execution of the security application by the DNS security gateway 128. The data storage 212 of the communication server 120 can additionally include various communications applications, including support for unified communications (UC) 220. Examples of other applications that can be executed by a communication server 120 include an email application 224, a voicemail application 228, and other communication applications 232, such as text and instant messaging applications.

In connection with a dynamic DNS server 124, a server application 236 adapted to respond to support requests for connection information required to establish a communication session between communication endpoints 116 can be provided. This connection information can be stored in a data cache 240. In support of communications between communication endpoints 116 within the enterprise 104 including the dynamic DNS server 124, the data cache 240 can include local data 244. This local data 244 can include the IP addresses currently assigned to communication endpoints 116 included in the enterprise 104, hosting information, or other information required to route communications (e.g., voice calls) between communication endpoints 116. In accordance with embodiments of the present disclosure, the data cache 240 can additionally include federation data 248. The federation data 248 can include data that originates from the federation broker 108, and that is required to establish a communication session between a communication device 116 within a first enterprise 104a and a communication device 116 included in a second enterprise 104b. This information can include information related to the entry point for the destination enterprise 104 and other information, such as Internet protocol addresses for a domain entry point, enterprise entry points, communication devices 116 or other nodes, naming authority pointer (NAPTR) information, server record (SRV) pointers, and the like. Accordingly, the federation data 248 can include all of the information required in order to complete a communication session or connection between a communication endpoint 116 associated with the enterprise 104 that includes the dynamic DNS server 124 maintaining the data cache 240, and that comprises information obtained from the federation broker 108 for the communication session or connection. In addition, the data cache 240 can include a negative cache 252. The negative cache can include entries indicating the absence of connection information in the records of the federation broker 108 with respect to particular communication endpoints 116 on an outside enterprise 104. In accordance with embodiments of the present disclosure, information contained within the federation data 248 and/or negative cache data 252 can be opaque to the dynamic DNS server 124. In particular, although the dynamic DNS server 124 can serve as a store for such information, it is not required to understand or to be able to operate on or in response to the federation data 248 or the negative cache data 252 included in the data cache 240, other than to store such data. Instead, such information can simply be passed from the dynamic DNS server 124 to the communication server 120, directly or through a DNS security gateway 128, in response to a query.

Figure 3:
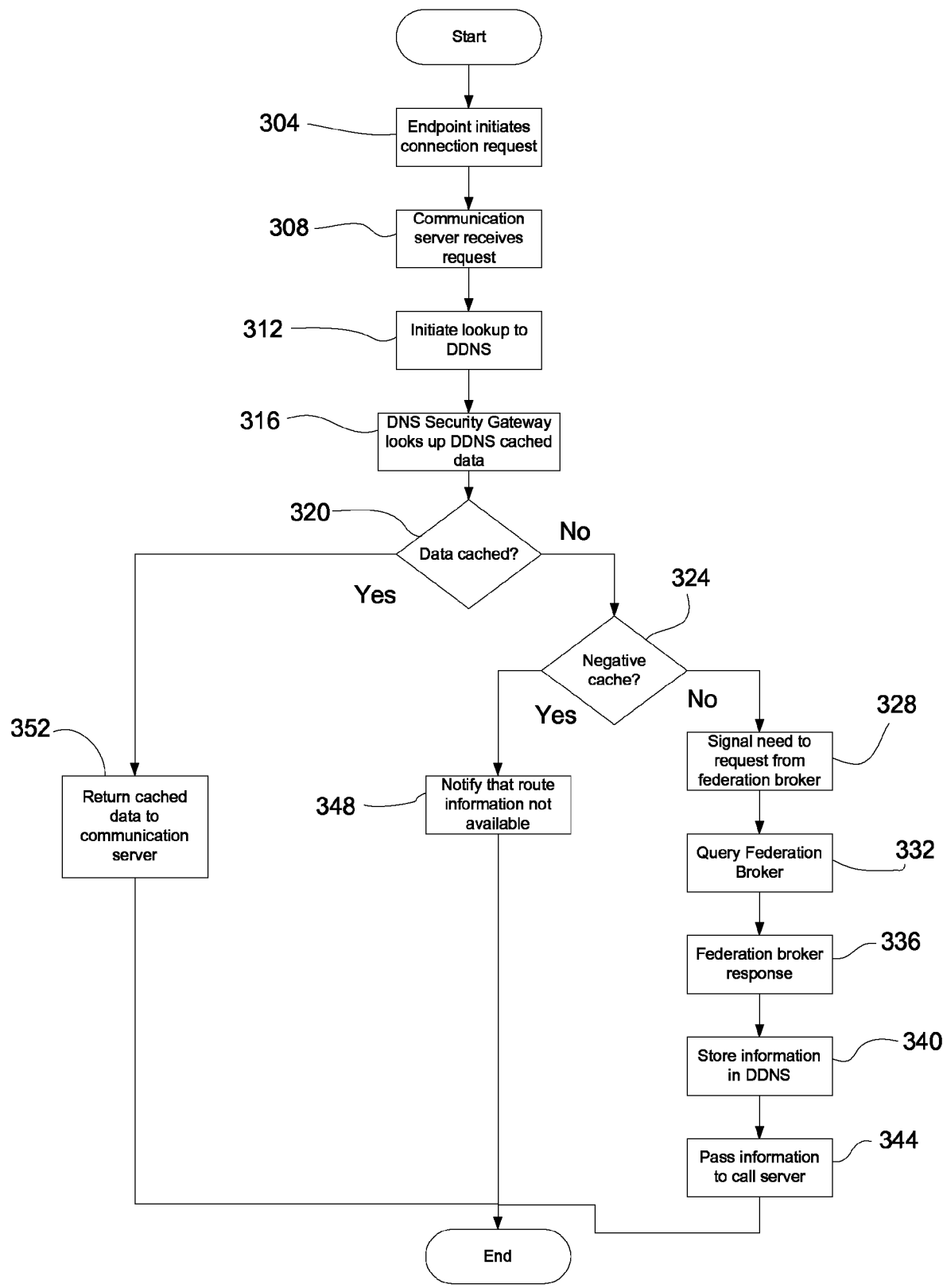
FIG. 3 is a flowchart illustrating aspects of the operation of a system in accordance with embodiments of the present disclosure.

FIG. 3 is a flowchart illustrating aspects of the operation of a system 100 in accordance with embodiments of the disclosed invention. Initially, at step 304, a communication endpoint 116 included within a first enterprise 104*a* initiates a request for a communication session with or connection to a communication endpoint 116 associated with a second enterprise 104*b*. As an example, and without limitation, the request can be for a voice telephony link. The request is received at the communication server 120 included in the enterprise 104*a* associated with the initiating communication endpoint 116 (step 308). The communication server 120 then initiates a lookup to resolve the destination and to obtain a federation route to the destination communication endpoint 116. The DNS security gateway 128 can operate as a default DNS relay, to lookup the destination and route information in the local dynamic DNS server 124 to determine whether the required data is available from the dynamic DNS server data cache 240 (step 316). At step 320, a determination is made as to whether the required data is available from the data cache 240 maintained by the dynamic DNS server 124.

If the required data is not found among the federation data 248 in the data cache 240, a determination can be made as to whether information regarding the requested connection or communication link is maintained in the negative cache 252 (step 324). If information regarding the requested connection is not maintained in the negative cache 252, the dynamic DNS server 124 can return a signal indicating that the required connection information will need to be requested from the federation broker (step 328). This signal can be handled by the communication server 120 and/or the DNS security gateway 128. In particular, the DNS security gateway 128 can query the federation broker 108 for the required information (step 332). The federation broker 108 then responds with the requested connection information, or with a signal indicating that the requested connection information is not available (step 336). At step 340, information related to the federation broker 108 response is stored in the dynamic DNS server 124. In particular, a response by the federation broker 108 providing the requested connection information is stored in the federated data cache 248, while a response indicating that the requested connection information is not available for an identified endpoint is stored in the negative cache 252. Accordingly, the dynamic DNS server 124 can maintain connection information and/or information indicating that the federation broker cannot provide requested connection information in the data cache 240. As a result, future requests to the dynamic DNS server 124 for information related to a destination communication endpoint 116 can be serviced by the dynamic DNS server 124, rather than requiring that the federation broker 108 be queried for such information. In addition, the information returned from the federation broker 108 is provided to the call server 120 and/or the DNS security gateway 128 for further processing (step 344). In particular, where the information required to complete the requested connections returned, the call server 120 can operate to establish that connection. Where the federation broker 108 is not able to provide the requested information, the call server 120 can indicate to the initiating communication endpoint 116 that the call has failed, and/or can operate to complete a connection using non-federated resources, such as the public switched telephony network.

If at step 324 an entry related to the destination communication endpoint 116 is found in the negative cache 252, a notification can be provided to the DNS security gateway 128 that is relayed to the communication server 120, indicating that federated route information for the requested connection is not available from the federation broker 108 (step 348). This notification can be in the form of an opaque signal or flag that indicates the absence of a DNS entry in the federation broker 108. Accordingly, where information is held in the negative cache 252 with respect to a requested connection, a fruitless call to the federation broker 108 can be avoided.

If the required data is cached, that data is returned to the communication server 120, which can apply the data to complete the requested connection across the communication network or networks 112 to the second enterprise 104*b*, where the connection to the destination communication endpoint 116 can be completed, establishing a communication session between the initiating and destination communication endpoints 116 (step 352). Accordingly, if the data required for the connection is available from the data cache 240, a lookup involving a call to the federation broker 108 is not required.

After completing the call or otherwise responding to the initiating communication endpoint 116, the process can end. As can be appreciated by one of skill in the art after consideration of the description provided herein, the information returned by the federated broker 108, either directly or via information cached by the dynamic domain name server 124, can include information to facilitate the efficient routing of communication links across communication networks 112. In addition, information maintained in a data cache 240 can be updated from time to time. Moreover, embodiments of the present disclosure allow calls or other communication links between federated enterprises 104 to be made, while maintaining standard federated route resolution processes, and while preserving the standard behavior of the communication server 120.

Although certain examples have discussed certain applications and/or processes being executed by particular components of the system 100, other arrangements are possible. For example, the execution of applications and/or processes can be distributed among different components. As an example, processes involving interactions with a communication endpoint can be executed by a communication server 120, while processes involving interactions with a dynamic DNS server 124 and/or a federation broker 108 can be executed by a DNS security gateway 128. As a further example, the functions of a DNS security gateway 128 can be integrated into a communication server 120.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for facilitating connections in a federated communication system, comprising:

receiving at a communication server of a first enterprise a request for a connection to a first endpoint, wherein the first endpoint is outside of the first enterprise;

in response to receiving the first request for the connection to the first endpoint, making, by the communication server of the first enterprise, a first request to a dynamic domain name system server of the first enterprise for required connection information;

receiving from the dynamic domain name system server to the communication server a first lookup failure signal;

in response to the returned first lookup failure signal, making a second request from the communication server of the first enterprise to a federation broker for the required connection information, wherein the federation broker is a dynamic naming system server for two or more enterprises;

receiving from the federation broker a second lookup failure signal indicating that the required connection information is not available; and storing, in the dynamic domain name system server of the first enterprise, the indication that the required connection information for the first endpoint is not available from the federation broker.

2. The method of claim 1, wherein a required connection information is returned.

3. The method of claim 2, further comprising:
returning the required connection information to the first enterprise;and
storing the required connection information in the dynamic domain name system server.

4. The method of claim 3, further comprising:
providing the required connection information to an initiating endpoint.

5. The method of claim 1, wherein the request for the first connection includes an Internet Protocol address of the first endpoint, and wherein the required information includes network routing information.

6. The method of claim 1, wherein the request for the first connection includes a telephone number of the first endpoint, and wherein the required information includes a network routing information.

7. The method of claim 1, wherein the required information includes information that is opaque to the dynamic domain name system server.

8. The method of claim 1, further comprising:
receivng at the communication server of a enterprise a second request for the connection to the first endpoint;
making a second request to the dynamic domain name system server of the first enterprise for the required connection information; and
returning from the dynamic domain name system server to the communication server a second lookup failure signal, wherein the second lookup failure signal is based on the stored indication that the required connection information for the first endpoint is not available from the federation broker.

9. The method of claim 8 further comprising providing the second lookup failure signal to an different initiating endpoint.

10. A system for facilitating connections in a federated communication system, comprising:
a communication server of a first enterprise, comprising a first hardware processor that:
receives a first request for a connection to a first endpoint, wherein the first endpoint is outside of the first enterprise,
makes a first request to a dynamic domain name system server of the first enterprise for required connection information,
makes a second request to a federation broker for the required connection information in response to a returned first lookup failure signal, wherein the federation broker is a dynamic domain naming system server for two or more enterprises, and
receives from the federation broker a second lookup failure signal indicating that the required connection information is not available; and
an interface to a dynamic domain name system that receives from a dynamic domain name server comprising a second hardware processor that returns to the communication server the first lookup failure signal and stores the indication that the required connection information for the first endpoint is not available from the federation broker.

* * * * *

UNITED STATES PATENT AND TRADEMARK OFFICE
CERTIFICATE OF CORRECTION

| | | |
|---|---|---|
| PATENT NO. | : 9,215,204 B2 | Page 1 of 1 |
| APPLICATION NO. | : 13/285383 | |
| DATED | : December 15, 2015 | |
| INVENTOR(S) | : Mahalingam Mani, David Ahrens and Manish Gaur | |

It is certified that error appears in the above-identified patent and that said Letters Patent is hereby corrected as shown below:

In the Claims

At Column 6, line 65, after "enterprise a" please insert --first-- therein.

At Column 7, line 12, after "dynamic" insert --domain-- therein.

At Column 8, line 2, please delete "receivng" and replace it with --receiving-- therein.

At Column 8, line 2, after "server of a" insert --first-- therein.

Signed and Sealed this
Fourteenth Day of June, 2016

Michelle K. Lee
*Director of the United States Patent and Trademark Office*